United States Patent [19]
Miller

[11] 4,340,897
[45] Jul. 20, 1982

[54] CLEANING DEVICE FOR WRITING HEADS USED IN INK JET RECORDERS AND PRINTERS

[75] Inventor: Peter T. Miller, Norwalk, Conn.

[73] Assignee: Pitney Bowes Inc., Stamford, Conn.

[21] Appl. No.: 288,245

[22] Filed: Jul. 29, 1981

[51] Int. Cl.³ ........ G01D 15/18
[52] U.S. Cl. ........ 346/140 R; 346/75
[58] Field of Search ........ 346/140 R, 75

[56] References Cited

U.S. PATENT DOCUMENTS 4,112,435 9/1978 Kattner ........ 346/140 R
4,123,761 10/1978 Kimura ........ 346/140 R
4,144,537 3/1979 Kimura ........ 346/140 R
4,306,245 12/1981 Kasugayama ........ 346/140 R

*Primary Examiner*—Joseph W. Hartary
*Attorney, Agent, or Firm*—Melvin J. Scolnick; William D. Soltow, Jr.; Albert W. Scribner

[57] ABSTRACT

An apparatus for use in an ink jet recording device or printer for cleaning a writing head having at least one orifice therein through which ink flows is disclosed. The apparatus comprises a manifold movable in a horizontal direction and including an internal reservoir and a brush formed of a plurality of fiber elements extending from the reservoir through the manifold, the fiber elements being urged into contact with the writing head upon sufficient movement of the manifold; a vacuum system communicating in fluid flow with the reservoir for forming a negative air pressure along the fibers; and an ink collecting chamber for containing discharged ink from the writing head, the chamber communicating in fluid flow with both the manifold and the vacuum system, whereby upon the fibers being urged into contact with the writing head the vacuum system causes ink to flow from the writing head along the fibers and into the collecting chamber.

11 Claims, 7 Drawing Figures

CLEANING DEVICE FOR WRITING HEADS USED IN INK JET RECORDERS AND PRINTERS

BACKGROUND OF THE INVENTION

I. Field of the Invention

This invention relates to a cleaning device, and in particular, to a cleaning device for cleaning the writing heads used in ink jet recorders and printers.

II. Statement of the Prior Art

Typically, in an ink jet recorder or printer, the ink is pumped under pressure to a manifold having one or more openings or orifices through which the ink is forced onto a recording surface. For example, in an ink jet printer there is provided a rapid and quiet method of printing with tiny drops of ink. During ink jet printing, the ink drops are ejected from hundreds of orifices having diameters typically less than 0.003 inches in an ink head which is closely spaced (commonly of the order of 1 to 1.5 mm for impulse ink jets, but larger distances for continuous ink jets) from the record medium on which characters or other information is to be printed. The characters are formed by small ink drops which, depending upon a variety of well-known factors such as the ink and paper, result in varying degrees of printing quality. It is, of course, critical to the proper operation of an ink jet recorder or printer that the openings through which the ink passes remain clean and unobstructed. However, it has been found that this is not an easy objective to accomplish. For example, the exit area of the openings on the ink head tend to attract particles or impurities from the surrounding atmosphere which interfere with the flow of the ink through the openings. The ink itself tends to thicken or completely dry around the openings thereby interfering with the formation of perfectly straight ink drop streams flowing from the opening. The accumulation of dried ink or atmospheric impurities at the openings can also lead to the formation of air bubbles in the ink jet head orifices which in turn will cause the ink jet head to malfunction.

Many different attempts have been made to solve the above outlined problems by either providing various types of cleaning compositions which are added to the ink itself or securing a cleaning device to the ink jet apparatus. For example, U.S. Pat. No. 4,256,610 discloses an aqueous based composition used for removing ink residues and other foreign matter from the orifices and other fluid areas of an ink jet recording apparatus. U.S. Pat. Nos. 4,007,465 and 4,050,078 describes various mechanical systems for cleaning ink jet heads.

In U.S. Pat. No. 4,112,435, there is described a mechanical device in the form of a shield and wiper for cleaning ink jet recording devices. The device consists of a shield member mounted on the writing head and movable between a blocking position in front of the orifices of the writing head and an operating position spaced from and clear of the orifices. The shield is equipped with a resilient wiping arm which wipes across the face of the writing head during movement between the positions. One problem with this type of device is that it cleans by a squeeze action which can leave a film of ink on the writing head that can interfere with the subsequent firing of the ink jets. It is also possible with this type of squeeze action to draw ink out of the orifices of the writing head which would add to the ink left behind in the form of a film and therefore further interfere with the firing of the heads. The ink removed by the cleaner described in this patent falls by gravity away from the writing head. This limits using the heads in a horizontal position since to position the heads vertically would allow ink to creep back into the orifices. Furthermore, removing the excess ink in this manner allows the ink to get on other portions of the machine which is not very desirable. In addition, this type of cleaning device will work primarily on a flat surface. It would therefore require a careful alignment procedure.

U.S. Pat. No. 4,223,322 discloses a device for cleaning an ink writing head in an ink printer. The device includes a liquid absorbing cleaning medium in the form of a movable tape supported between two reels. The tape is brought into contact with the orifices in the ink writing head to permit ink to flow from the nozzles to the cleaning medium to be absorbed by the medium. In this type of device the ink is absorbed into the cleaning medium with no specific control as to how the ink spreads. To thereby adequately remove all the ink a large cleaning surface area of non-reusable material is used. This system is further limited in that it cannot be used for cleaning irregularly shaped surfaces. Furthermore, as a cleaner, the device is relatively complicated in design having several moving parts and is therefore more prone to failure and relatively expensive.

SUMMARY OF THE INVENTION

It is therefore an object of the present invention to overcome many of the disadvantages of cleaning devices typically used for ink jet recorders and printers as described in the prior art, and to provide a cleaning device for cleaning the writing heads used in ink jet recorders or printers, that is extremely efficient in operation and is able to remove substantially all of the excess ink that one desires to remove from the writing heads to thereby prevent frequent ink clogging of the orifices in the heads and interference with jet firing.

It is a further object of this invention to provide a cleaning device for an ink jet writing head that does not limit the positioning of the writing head in the machine.

It is a further object of this invention to provide a cleaning device for an ink jet writing head that will function properly with substantially any shaped writing head, and which conforms to the surface of any writing head simply, easily and substantially without any major effort.

It is a further object of the present invention to provide a cleaning device for an ink jet writing head that will efficiently remove solid particles e.g. paper, dust, ashes, etc. from the writing head as well as excess ink.

It is still a further object of the present invention to provide a cleaning device for an ink jet writing head that provides for an unidirectional flow of the ink away from the orifices of the writing head.

It is still a further object of the present invention to provide a cleaning device for an ink jet writing head that is simple in design, requires few moving parts, is reusable, is less expensive and is less prone to failure than the cleaning devices known in the prior art.

The foregoing objects and others are accomplished in accordance with the present invention by providing an apparatus for use in an ink jet recording device or printer for cleaning a writing head having at least one orifice therein through which ink flows comprising manifold means that is movable in a horizontal direction and includes an internally located reservoir and a brush formed of a plurality of fiber elements extending from the reservoir through the manifold, the elements being urged into contact with the writing head upon sufficient movement of the manifold. A vacuum means communicates in fluid flow with the reservoir and thereby forms a negative air pressure along the fibers. Also included in a chamber means for containing discharged ink from the writing head, the chamber means communicating in fluid flow with both the manifold and the vacuum means, whereby upon the fibers being urged into contact with the writing head, the vacuum means causes ink to flow from the writing head along the fibers and into the collecting chamber.

In the preferred embodiment of the present invention the cleaning apparatus, as more fully described hereinbelow, has particular use in an ink jet printing device for cleaning an ink jet writing head having a plurality of orifices therein through which the ink flows. One or more of the cleaning apparatus as described herein can be employed which depends upon the number of ink jet writing heads used in the printing system.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
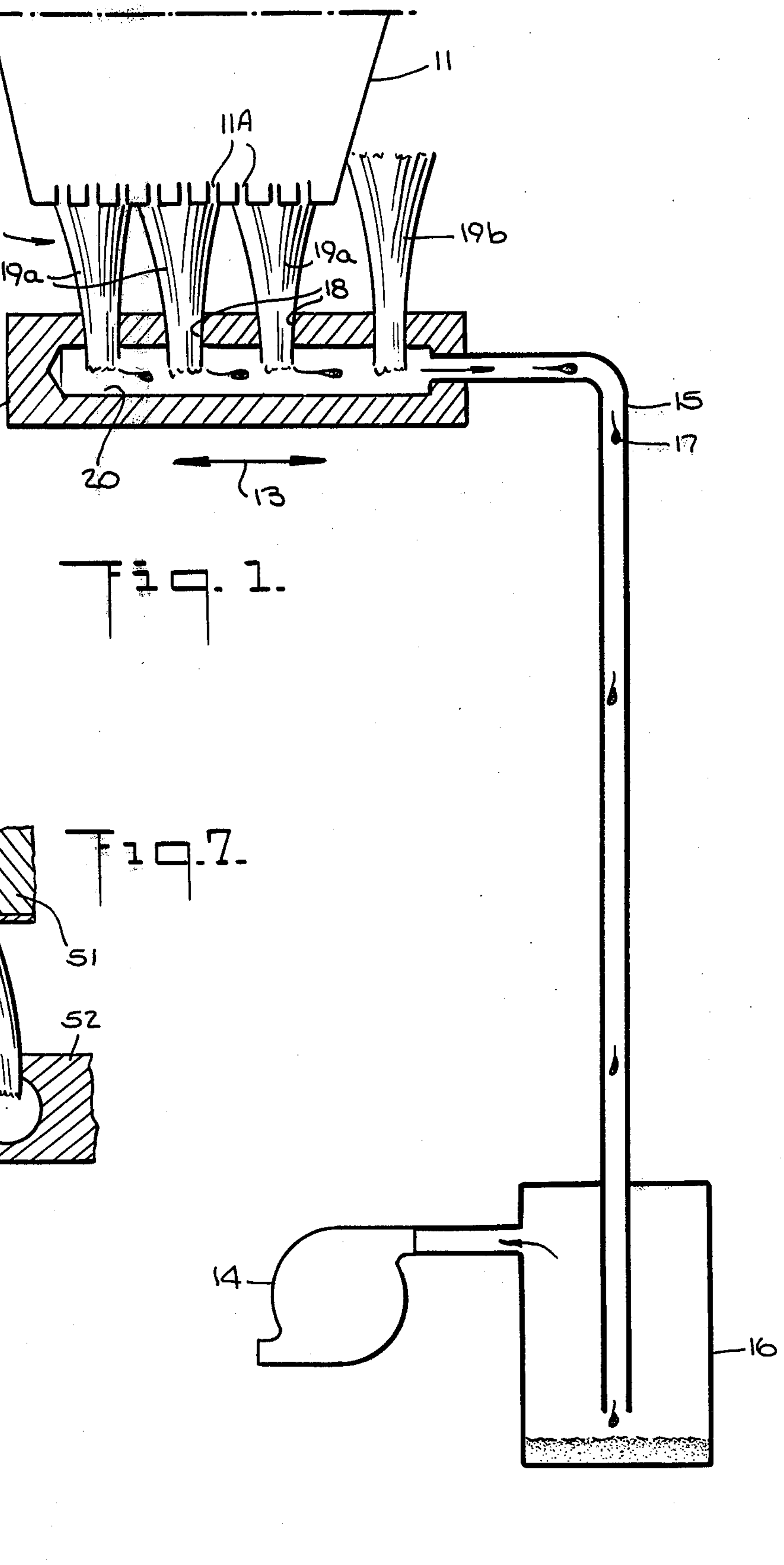
FIG. 1 is a diagrammatic plan view of the elements of a cleaning device in accordance with the present invention positioned for cleaning a writing head.

Referring now to the drawings, and particularly to FIG. 1 thereof, there is shown in accordance with the present invention a cleaning system 10 for cleaning writing heads 11 as typically used in an ink jet recording device or printer. Specifically, there is shown a manifold 12 that is movable in a horizontal direction as shown by arrow 13. A means for forming a vacuum preferably in the form of vacuum pump 14 draws a vacuum on a chamber means through hose 15 and thereby draws both air and fluid out of manifold 12. The chamber means, preferably in the form of ink collector chamber 16, acts as a storage means for the fluid 17 drawn out of manifold 12. Located in the upper surface of the manifold are small holes or openings 18, each including brushes 19 formed of a plurality of fiber elements extending from reservoir 20 located within manifold 12, through the top surface of the manifold. In operation, brushes 19 will normally be drawing air through the small capillary cross-sections of the fiber elements forming the brushes until they come in contact with writing head 11 such as an ink jet writing head, at which point the brushes will begin to wick up ink from nozzles (orifices) 11*a* and the ink will be drawn down through the fiber elements into reservoir 20, and through hose element 15 which connects the reservoir to ink collector chamber 16. As stated, brushes 19 are formed of a plurality of fiber elements. In accordance with the present invention the fiber elements should preferably be formed of a material which (i) will not react chemically with ink; (ii) will be harder than the metal which forms the writing heads, but not sufficiently hard enough to damage the writing heads; (iii) will be sufficiently abrasive to be able to remove substantially any debris or foreign particles from the writing heads; and (iv) will have sufficient stiffness to maintain their shape. Examples of some of the materials which could be used to form these fiber elements include glass, certain plastics such as ultra-high molecular weight polyethylenes and certain mineral fibers such as, asbestos.

In accordance with the present invention, it is not necessary to provide a very low pressure within cleaning system 10 for withdrawing fluids from writing head 11 to chamber 16. What is sufficient is a moderate amount of pressure, depending upon a number of factors. The type of vacuum pump 14 needed to remove both ink and air from manifold 12 depends upon the number of brushes 19 in each manifold and the number of manifolds that are being used, i.e. the number of cleaning systems 10 being used in the ink jet apparatus. For example, with three brushes in a single manifold, the air flow rate will be approximately 10 cc per second, per writing head and the pressure will be around 18" of mercury.

Figure 2:
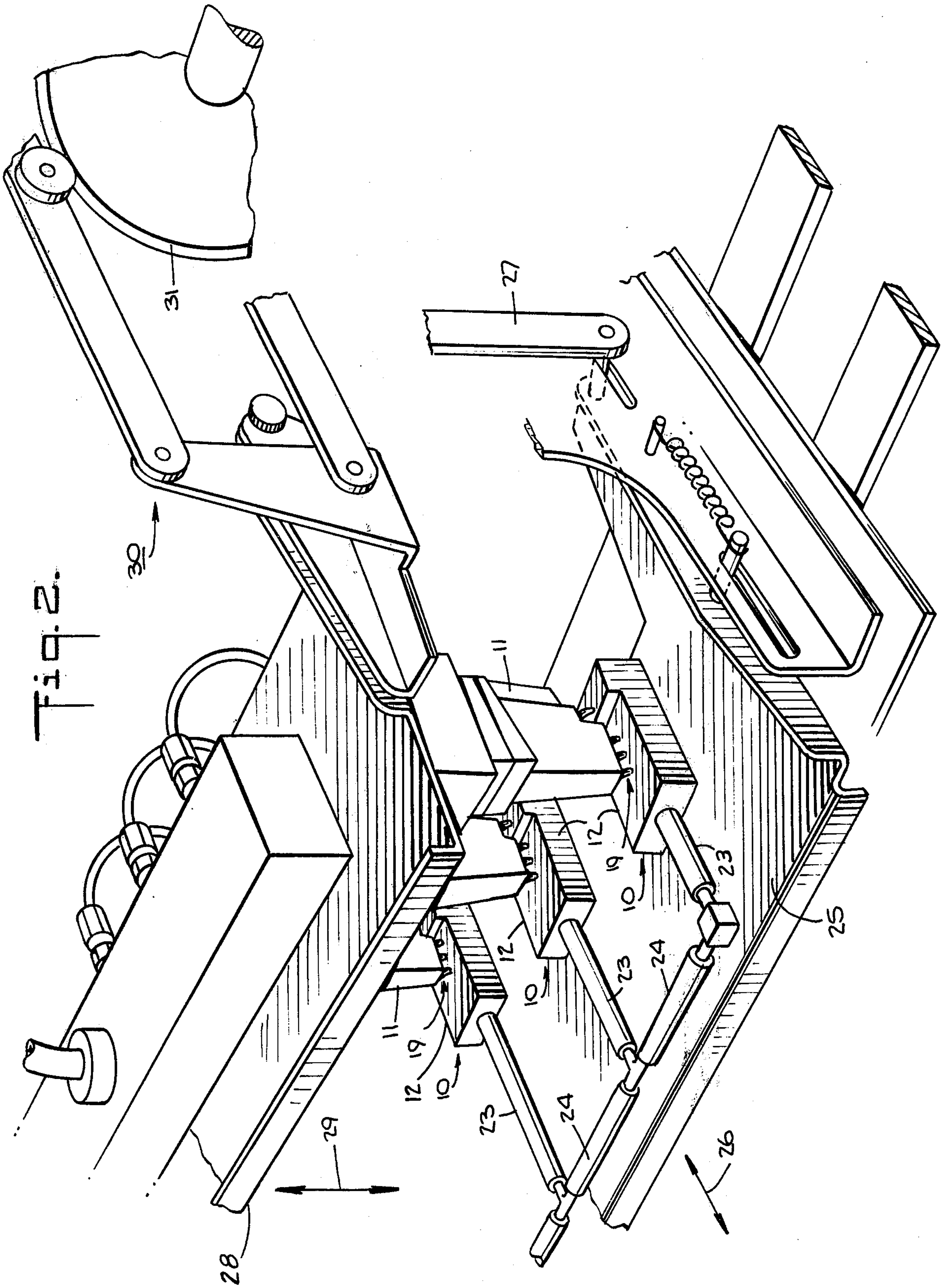
FIG. 2 is a fragmentary isometric view of a cleaning device in accordance with the present invention in an ink jet printing apparatus.

The cleaning apparatus in accordance with the present invention can be used in an ink jet printing system that employs a plurality of writing heads such as the ink jet addresser illustrated in FIG. 2. As shown, there is included a single manifold 12 with brushes 19 extending from each manifold that is associated with each of several printing heads 11. These manifolds are connected by hose elements 23 to a common hose connection 24 which allows the ink to flow under vacuum from the nozzles in each of the heads to a common ink collection chamber (not shown). All of manifolds 12 are supported on movable carriage 25 which moves in a horizontal position as shown by arrow 26. Carriage 25 is connected via linkage 27 to a motor driven cam (not shown) from which the carriage is horizontally driven. Writing heads 11 are secured to member 28 which moves the heads in a vertical position as shown by arrow 29. Member 28 is secured via cam linkage 30 to cam 31. The movement of cam 31 and the cam which operates on carriage 25 are synchronized. Both cams are secured to the same shaft (not shown) and are motor driven.

Whether the cleaning system consists of one or more manifolds, the cleaning brushes that are used in the manifold consist basically of two types. As shown in FIG. 1 brushes 19 include a small brush 19*a* of which there are usually several on which the writing head 11 actually rests or does its purging. The second type of brush is a taller brush 19*b* of which there is typically only one extending from each manifold. In view of its length, taller brush 19*b* is preferably more flexible than any of the shorter brushes 19*a*. In operation, taller brush 19*b* lightly brushes against writing head 11 to wipe the excess ink off the head.

Figure 3:
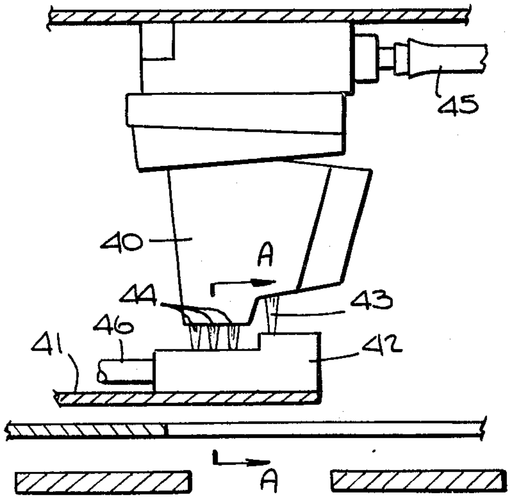
FIGS. 3 through 6 are side plan views partly in section illustrating the various positions during the cleaning operation of a cleaning device in an ink jet printing apparatus.
Figure 4:
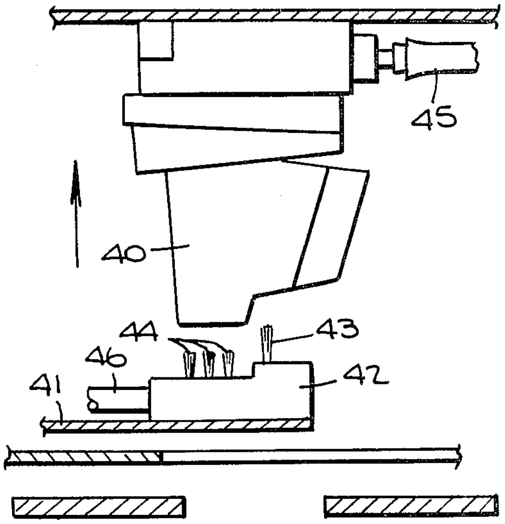
Figure 5:
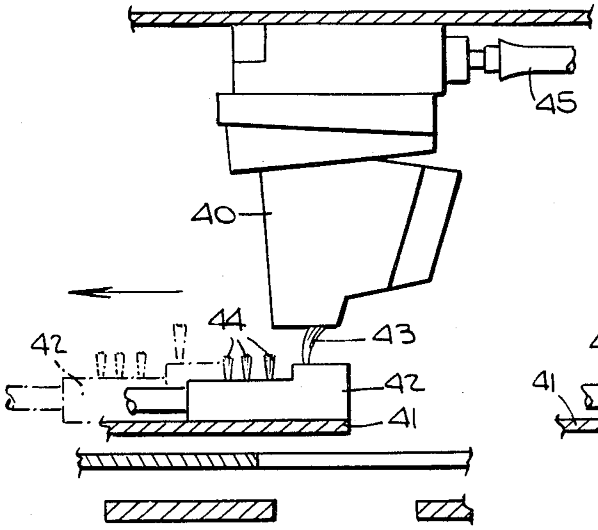
Figure 6:
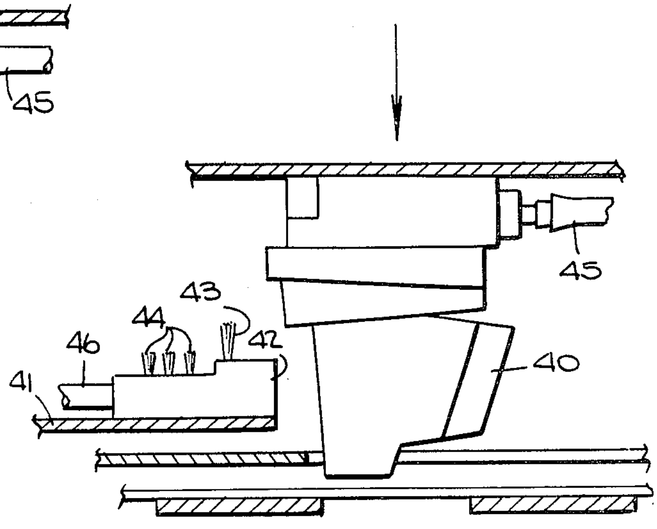

An example of how a cleaning apparatus in accordance with the present invention operates in an ink jet printing system is illustrated in FIGS. 3 through 6. At the point in the operation of the ink jet printing system where the print quality is noted to be poor and a purge is required, the purge button on the front panel of the machine, such as an ink jet addresser (not shown) is pressed. This causes several things to happen. First, the ink jet writing heads 40 which are constrained to move along a vertical plane, are raised vertically. After they have been raised to their highest position, carriage 41, on which cleaning manifolds 42 are positioned moves to a position underneath the writing heads with the taller brushes 43 out of contact with the orifices of the heads. Writing heads 40 are then lowered a sufficient amount so that they are just in contact with smaller brushes 44 (FIG. 3). The vacuum pump thereafter turns on and lowers the pressure in the cleaning system to the required amount of pressure. The vacuum pump as well as the vertical motion of writing heads 40 and the horizontal motion of carriage 41 can all be ultimately controlled by a micro-computer unit (not shown) which can include a specific program which is activated when a signal is received that the purge button has been pressed. At this point in the cleaning process, a sufficient time is allowed to pass to permit any excess ink that might have been left behind in the bristles to be drawn out by the vacuum pump into the ink collection chamber. After this set period of time has passed, a purge pump (not shown) turns on providing higher pressure to the ink in the ink supply line 45 which supplies ink to the writing heads. At the same time, a valve (not shown) closes thereby preventing ink from over pressurizing the ink reservoir which feeds ink to the head. Thereafter, this ink supply is pumped directly through the writing heads. This forces any debris in the lines out through the nozzles in heads 40, pushes out any air bubbles, reprimes the heads for the next printing operation and does any other necessary functions that you would want to purge for. The excess ink which is now collecting on the end of the nozzles of the writing heads drains into shorter brushes 44 and is then drawn away by the vacuum in manifold 42 which pulls air and ink along hose 46 to the ink collection chamber. After a set period of time, the purge supply pump is turned off and the vacuum pump is left on for approximately 2 2½ minutes. This assures that substantially all of the ink has been collected out of the brushes and out of the ink head manifolds. The micro-computer now sends a new command to the system which raises the writing heads (FIG. 4) a sufficient distance such that as another signal from the computer pulls the brushes past the writing heads the taller rear brushes 43 wipes the face of the ink jet writing heads clean of ink (FIG. 5). Thereafter the computer sends a signal to carriage 41 which moves the manifolds forward to a park position. The ink jet writing heads 40 are then lowered down to their set positions and are ready for the printing operation (FIG. 6). When it is subsequently observed by the operator that the print quality of the system becomes poor, or if ink jet are missing or misfiring, the operator would press the purge button and the micro-computer would take over and go through the purge cycle as described above.

Figure 7:
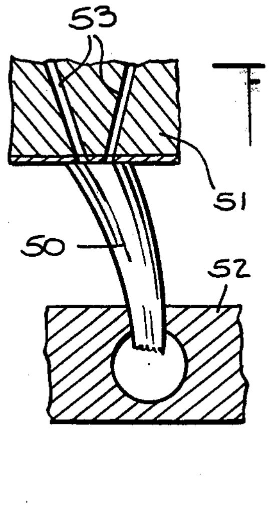
FIG. 7 is a sectional plan view taken along line A—A of FIG. 3.

In FIG. 7 there is illustrated the positioning of a cleaning brush 50 during a typical cleaning operation as described above. When writing head 51 is lowered onto brush 50, the brush flexes over as illustrated. This (1) prevents the brush from being crushed by the writing head, (2) prevents the brush from being pressed into manifold 52 and (3) prevents the brush fibers from going into nozzles 53.

While this invention has been described in conjunction with specific embodiments thereof, it is evident that many alternatives, modifications and variations will be apparent to those skilled in the art. Accordingly, the present invention is intended to embrace all such alternatives, modifications and variations, and fall within the spirit and scope of the appended claims.

What is claimed is:

1. An apparatus for use in an ink jet recording device or printer for cleaning a writing head having at least one nozzle therein through which ink flows, said apparatus comprising:

manifold means movable in a horizontal direction and including an internally located reservoir and a brush formed of a plurality of fiber elements extending from the reservoir through the manifold, the fiber elements being urged into contact with said nozzles upon sufficient movement of the manifold;

vacuum means communicating in fluid flow with said reservoir for forming a negative air pressure along said fibers; and chamber means communicating in fluid flow with both said manifold and said vacuum means, whereby upon said fibers being urged into contact with said nozzles said vacuum means causes ink to flow from said writing head along said fibers and into said chamber.

2. An apparatus according to claim 1 wherein said fibers are of a material that will not react chemically with said ink.

3. An apparatus according to claim 2 wherein said fibers are glass.

4. An apparatus according to claim 1 wherein a plurality of brushes extend from said manifold.

5. An apparatus according to claim 4 wherein at least one of said brushes extends beyond said manifold a distance greater than the other brushes.

6. In an ink jet printer having a plurality of ink jet writing heads each of said heads having a plurality of nozzles through which ink flows, an apparatus for cleaning each of said writing heads comprising:

a manifold means positioned at each of said writing heads, each manifold movable in a horizontal direction and including an internally located reservoir and a brush formed of a plurality of fiber elements extending from the reservoir through the manifold, the elements being urged into contact with said nozzles upon sufficient movement of the manifolds;

vacuum means communicating in fluid flow with said reservoir for forming a negative air pressure along said fibers located on each of said manifolds; and chamber means for containing discharged ink from said writing heads, the chamber means communicating in fluid flow with both said manifolds and said vacuum means, whereby upon said fibers being urged into contact with said nozzles said vacuum means causes ink to flow from said writing heads along said fibers and into said chamber.

7. An apparatus according to claim 6 wherein said manifold means are secured to a movable carriage within said printer.

8. An apparatus according to claim 6 wherein said fibers are glass.

9. An apparatus according to claim 6 wherein a plurality of brushes extend from each of said manifolds.

10. An apparatus according to claim 9 wherein at least one of said brushes on each of said manifolds extends beyond said manifold a distance greater than the other brushes.

11. An apparatus according to claim 6 wherein said printer is an ink jet addresser.

* * * * *